US012267653B2

(12) United States Patent
Von Elling

(10) Patent No.: US 12,267,653 B2
(45) Date of Patent: Apr. 1, 2025

(54) NOISE REDUCTION SYSTEM, METHOD OF OPERATING THE SYSTEM AND USE OF THE SYSTEM

(71) Applicant: recalm GmbH, Hamburg (DE)

(72) Inventor: Marc Von Elling, Hamburg (DE)

(73) Assignee: recalm GmbH, Hamburg (DE)

( * ) Notice: Subject to any disclaimer, the term of this patent is extended or adjusted under 35 U.S.C. 154(b) by 133 days.

(21) Appl. No.: 18/221,002

(22) Filed: Jul. 12, 2023

(65) Prior Publication Data

US 2024/0031752 A1 Jan. 25, 2024

(30) Foreign Application Priority Data

Jul. 19, 2022 (DE) ..................... 10 2022 118 018.2

(51) Int. Cl.
*G10K 11/178* (2006.01)
*H04R 29/00* (2006.01)

(52) U.S. Cl.
CPC ....... *H04R 29/005* (2013.01); *G10K 11/1785* (2018.01); *H04R 2400/01* (2013.01); *H04R 2410/01* (2013.01); *H04R 2499/13* (2013.01)

(58) Field of Classification Search
CPC ....... G10K 11/17825; G10K 11/17875; G10K 11/17879; G10K 2210/3215; G10K 2210/3217
See application file for complete search history.

(56) References Cited

U.S. PATENT DOCUMENTS

| | | | |
|---|---|---|---|
| 5,381,485 A | 1/1995 | Elliott | |
| 2013/0163774 A1 | 6/2013 | Maeda | |
| 2015/0172813 A1 | 6/2015 | Goto et al. | |
| 2019/0051283 A1 | 2/2019 | Malka et al. | |
| 2021/0323562 A1 | 10/2021 | You et al. | |
| 2023/0160454 A1* | 5/2023 | Kobayashi ....... | G10K 11/17879 381/71.7 |

FOREIGN PATENT DOCUMENTS

| | | |
|---|---|---|
| EP | 3 435 372 A1 | 1/2019 |
| WO | 2020/047286 A1 | 3/2020 |
| WO | 2021/250237 A1 | 12/2021 |

* cited by examiner

*Primary Examiner* — Kile O Blair

(74) *Attorney, Agent, or Firm* — Scully, Scott, Murphy & Presser, P.C.

(57) ABSTRACT

A noise reduction system for actively compensating background noise generated by a noise source in a noise reduction area in a passenger transport area of a vehicle. The system includes a microphone array having a reference microphone. An averaging unit is configured to calculate an average error signal, which is calculated based on at least the error signal of a virtual microphone and a direct residual signal of a directed monitor microphone.

14 Claims, 5 Drawing Sheets

NOISE REDUCTION SYSTEM, METHOD OF OPERATING THE SYSTEM AND USE OF THE SYSTEM

CROSS-REFERENCE TO RELATED APPLICATION

The present application is based upon and claims the benefit of priority from DE 10 2022 118 018.2 filed on Jul. 19, 2022, the entire contents of which is incorporated herein by reference.

BACKGROUND

Field

The present disclosure relates to a noise reduction system and more particularly to a noise reduction system for actively compensating background noise generated by a noise source in a noise reduction area in a passenger transport area of a vehicle.

Furthermore, the present disclosure relates to a method of operating a noise reduction system for actively compensating background noise generated by a noise source in a noise reduction area in a passenger transport area of a vehicle.

Prior Art

Noise reduction systems are known in various configurations. Noise reduction systems are also referred to as noise suppression systems, background noise suppression systems, background noise reduction systems and noise-canceling systems. A distinction is made between active and passive systems. In case of a passive system, sound-absorption materials are applied in order to reduce the undesired background noise in for example a passenger area of a vehicle. In active noise reduction systems, which are also referred to as active noise-canceling systems or active noise control systems (often abbreviated as "ANC"), active noise compensation by means of anti-noise (also referred to as "counter noise") is applied. The anti-noise is superimposed on the undesired background noise in that the background noise is reduced or almost completely eliminated in a quiet zone by means of destructive interference.

In the context of this disclosure, only active noise reduction systems are explained, even if these are not explicitly referred to as active noise reduction systems but rather merely as noise reduction systems.

In noise reduction systems, efficient suppression of the background noise can only be achieved within a small spatial region. This spatial region is typically referred to as a quiet zone and lies inside a noise reduction area of the system. In the quiet zone, the anti-noise is superimposed on the background noise in more or less exact phase opposition. Therefore, efficient suppression of the background noise occurs. This spatial limitation leads to the effect that active noise reduction systems are rather sensitive to movements of the head of a user. When the entrance of the auditory channel at the ear of the user is no longer located in the quiet zone, efficient background noise reduction cannot be guaranteed and the noise reduction system loses effectiveness.

This is why a relocation or readjustment of the noise reduction area is performed in many cases. Generally, noise reduction systems are driven by minimizing an error signal, which indicates the residual noise not canceled by the noise reduction system. To provide efficient noise-canceling, the residual noise near or at the auditory channel of the ear of the user should be minimized. To estimate said noise at a position in which no physical microphone can be placed or is not desired to be placed, the concept of "virtual microphones" has been established. This concept is basically described for example in U.S. Pat. No. 5,381,485.

When referring back to the movement of the user's head, the adaption of the noise reduction system to said movement is performed by relocating a position of the virtual microphone, which is configured to pick up the sum of the background noise and the anti-noise.

In many cases, a microphone array is applied for picking up a signal used for subsequent estimation of the signal at the position of the virtual microphone. There are various approaches applying different filters that are used to estimate a residual signal representing the sum of the background noise and the anti-noise at a position of the virtual microphone.

Furthermore, an active noise reduction system comprises a microphone for detecting the background noise of a noise source, the noise of which should be eliminated in the noise reduction area. This microphone is often referred to as a reference microphone. An anti-noise filter driving a sound generator that emits the anti-noise uses the signal of the reference microphone. The output of the anti-noise filter is not only used for driving the sound generator but is also input to a further filter. This is configured to estimate a muting signal representing the anti-noise at the position of the before mentioned virtual microphone. By subtracting the estimated muting signal from the estimated signal, which is the background noise and the anti-noise, an error signal can be derived. This error signal represents a cost function of the noise reduction system. By minimizing the value of the error function, the noise-canceling system is dynamically adapted to the noise generated by the noise source and by that, efficient noise reduction at the position of the virtual microphone can be achieved.

The position of the virtual microphone does however not match in all situations with the location of the auditory channel of the user's ear. In an attempt to provide a flexible and dynamic noise reduction in a noise reduction area, a plurality of virtual microphones can be established. A virtual microphone can be selected for active noise reduction, wherein a selection of the virtual microphone being located next to the detected location of the user's ear will provide the most efficient noise cancelation. Systems using a plurality of virtual microphone positions are for example known from EP 3 435 372 A1 or from WO 2020/047286 A1. The analysis of a plurality of virtual microphone positions however places a significant computational load on the control unit of the noise reduction system.

However, some noise reduction systems suffer from poor stability of the quiet zone, which means that under some operating conditions, the performance of the noise reduction system, which means the level of noise-canceling in the quiet zone does not reach the desired level.

SUMMARY

In view of the above, it is an object to provide a noise reduction system, a method of operating such a noise reduction system and the use of said system, wherein stable noise reduction performance should be provided under varying operating conditions.

Such object can be solved by a noise reduction system for actively compensating background noise generated by a noise source in a noise reduction area in a passenger transport area of a vehicle, the system comprising a controller, a reference sensor for detecting the background noise of the noise source, a sound generator for generating anti-noise for superimposing the anti-noise with the background noise in the noise reduction area for active reduction of the background noise, and a monitor-microphone array having a plurality of monitor microphones, the monitor-microphone array being disposed adjacent to the noise reduction area and being configured to pick up background noise emitted by the noise source and anti-noise emitted by the sound generator, wherein a virtual sensing algorithm is implemented in the controller, which is thereby configured to estimate an error signal at a position of a virtual microphone, wherein the virtual microphone is located in the noise reduction area and the error signal is indicative of a difference between the background noise and the anti-noise at the position of the virtual microphone, the controller further comprising an anti-noise unit for generating an anti-noise signal for driving the sound generator in that it generates the anti-noise,

- wherein the noise reduction system can be further enhanced in that
- the controller further comprises an averaging unit configured to calculate an average error signal, which is indicative of a difference between the background noise and the anti-noise at a position in the noise reduction area, wherein
- the monitor-microphone array comprises a direct monitor microphone and the averaging unit is configured to calculate the average error signal by further taking into account a direct residual signal of the direct monitor microphone and wherein
- the controller further comprises a dynamic adjustment unit, which is configured to update parameters of the anti-noise unit based on the average error signal and so as to minimize the average error signal.

For the direct monitor microphone, no residual signal representing the background noise and the anti-noise at a position of a virtual microphone is estimated or calculated. Instead of estimating the sound signal at the position of the virtual microphone, the direct signal of the direct monitor microphone, which means the signal detected by the microphone at the physical position thereof subtracted by the anti-noise, can be considered when calculating the average error signal. This counterintuitive measure surprisingly enhances the robustness and stability of the noise reduction algorithm. This phenomenon, which was confirmed in practical experiments, can for example be explained in that the signal from the physical position of the direct monitor microphone acts as a "golden reference" for the algorithm. It was therefore found that by further taking into account the signal, the robustness of the noise cancelation algorithm increases because the measurement values of the direct monitor microphone seem to compensate for estimation errors that inevitably occur for the at least one virtual microphone. Summarizing, this measure results in a significantly higher stability of the noise reduction system.

Within the context of this disclosure, the difference between the background noise and the anti-noise, which is the error signal, can be indicative of a residual noise, which is not cancelled by the noise reduction system. The position, for which said difference is calculated, is a position of a virtual microphone. The calculation for more than one position implies that the calculation is performed in that said difference is calculated for more than one position of a virtual microphone, i.e. for example for a plurality of virtual microphone or for a spatially extended virtual microphone.

According to an embodiment, the virtual sensing algorithm in the controller can be implemented according to the remote microphone technique. This has been proven advantageous in practical experiments because it can provide the best performance under the desired circumstances.

According to further embodiments, the virtual sensing algorithm can be implemented by other means. For example, the controller can comprise a virtual sensing algorithm which is a virtual microphone arrangement, a forward difference prediction technique, an adaptive LMS virtual microphone technique, a Kalman filtering virtual sensing algorithm or a stochastically optimal tonal diffuse field virtual sensing technique. One of these algorithms can be implemented in the controller according to further embodiments. Without prejudice, further reference will be made to the preferred embodiment, which is the implementation of the remote microphone technique, in the following.

According to an embodiment, the noise reduction system can be further enhanced in that a first filter unit configured to receive the anti-noise signal and to estimate a shifted anti-noise signal, which is indicative of the anti-noise at a physical position of one of the monitor microphones of the monitor-microphone array,

- a first arithmetic unit configured to receive the shifted anti-noise signal and a monitor signal of the monitor microphone being located at said physical position, wherein the first arithmetic unit can be configured to calculate a residual signal, which can be a difference between the monitor signal and the shifted anti-noise signal at the physical position of the monitor microphone,
- a second filter unit, which can be configured to receive the residual signal and to estimate a shifted residual signal, which can be the residual signal shifted to the position of the virtual microphone,
- a third filter unit can be configured to receive the anti-noise signal and to estimate a shifted anti-noise signal, which can be indicative of the anti-noise at the position of the virtual microphone,
- a second arithmetic unit can be configured to receive the shifted residual signal and the shifted anti-noise signal and to estimate the error signal for the position of the virtual microphone by addition of the shifted residual signal and the shifted anti-noise signal, and wherein

- the first filter unit can be further configured to estimate a shifted direct anti-noise signal, which can be indicative of the anti-noise at a physical position of the direct monitor microphone,
- the first arithmetic unit can be further configured to receive the shifted direct anti-noise signal and a direct monitor signal of the direct monitor microphone, wherein the first arithmetic unit can be configured to further calculate a direct residual signal, which can be a difference between the direct monitor signal and the shifted direct anti-noise signal at the position of the direct monitor microphone,
- the second filter unit and the second arithmetic unit can be configured to bypass the direct residual signal and
- the averaging unit can be further configured to calculate the average error signal, which can be an average of the at least one error signal for a position in the noise reduction area and the direct residual signal.

According to an alternative embodiment, the noise reduction system can be further enhanced in that the averaging unit can be configured to receive a plurality of monitor signals of monitor microphones being located at different physical positions and to estimate an area monitor signal, which can be indicative of a monitor signal captured by the monitor microphones for a predetermined area of the monitor microphones, wherein the controller can comprise:

a first filter unit configured to receive the anti-noise signal and to estimate a shifted area anti-noise signal, which is indicative of the anti-noise in the predetermined area, a first arithmetic unit configured to receive the shifted area anti-noise signal and the area monitor signal, wherein the first arithmetic unit is configured to calculate an area residual signal, which is a difference between the area monitor signal and the shifted area anti-noise signal, a second filter unit, which is configured to receive the area residual signal and to estimate a shifted area residual signal, which is the area residual signal shifted to a predetermined virtual area comprising more than one position of a virtual microphone, a third filter unit configured to receive the anti-noise signal and to estimate a shifted area anti-noise signal, which is indicative of the anti-noise in the predetermined virtual area, and the averaging unit can further comprise a second arithmetic unit configured to receive the shifted area residual signal and the shifted area anti-noise signal and to estimate the error signal for the predetermined virtual area as the average error signal, by addition of the shifted area residual signal and the shifted area anti-noise signal, and wherein the averaging unit can be configured to bypass a direct monitor signal of the direct monitor microphone, the first arithmetic unit can be further configured to receive the shifted direct anti-noise signal and a direct monitor signal of the direct monitor microphone, wherein the first arithmetic unit can be configured to further calculate a direct residual signal, which can be a difference between the direct monitor signal and the shifted direct anti-noise signal at the position of the direct monitor microphone, the first arithmetic unit can be further configured to receive the shifted direct anti-noise signal and a direct monitor signal of the direct monitor microphone, wherein the first arithmetic unit can be configured to further calculate a direct residual signal, which can be a difference between the direct monitor signal and the shifted direct anti-noise signal at the position of the direct monitor microphone, the second filter unit and the second arithmetic unit can be configured to bypass the direct residual signal and the averaging unit can be further configured to calculate the average error signal, which can be an average of the error signal for the predetermined virtual area and the direct residual signal.

By taking into account a plurality of virtual microphones, in the noise reduction area, the quiet zone can be maximized According to the alternative embodiment, the calculation is not performed for a plurality of points at which the virtual microphone can be placed but right from the beginning, the calculation can be based on a predetermined section of the noise reduction area, which can be a sub area thereof. The average error signal can take into account the signal of the direct monitor microphone, which leads to unparalleled stability of the noise-canceling algorithm.

Furthermore, the practical implementation according to the above-referred embodiment was found advantageous for implementation of the reference microphone.

In still another embodiment, the noise reduction system can be further enhanced in that a plurality of positions are located in the noise reduction area and the controller can be configured to estimate at least a first error signal for a virtual microphone located at a first position and a second error signal for a virtual microphone located at a second position and the averaging unit can be configured to calculate the average error signal from at least the first and the second error signal, wherein the averaging unit can be further configured to calculate the average error signal, which can be a weighted average of the at least first and second error signal.

The noise reduction system can further comprise a position detection unit configured to detect a position and/or orientation of a head of a passenger and to estimate a position of an ear of a passenger in the passenger transport area, wherein the controller can be further configured to select a main position of the plurality of positions, which can be adjacent to, such as close to, the estimated position of the ear of the passenger, wherein the averaging unit can be configured to overweight the error signal at the main position when calculating the average error signal.

The detection unit can function as a head tracker for tracking the head of the user. An estimated position of an auditory channel of the user can be determined. By shifting the position of the virtual microphone, the quiet zone can follow the movement of the passenger's head. It could be found that in this situation where the quiet zone is dynamic, the physical reference microphone can provide unparalleled stability of the noise-canceling algorithm in the quiet zone.

The noise reduction system can be further enhanced in that the controller can further comprise at least one band pass unit, which can be configured to apply a band pass filter on the average error signal and/or on a noise signal picked up by the reference sensor for detecting the background noise of the noise source.

The band pass filter can be a band pass for the frequency range between 50 Hz and 600 Hz. Furthermore, it can be a low-pass filter, wherein a cutoff frequency of the low-pass filter is between 400 Hz and 1000 Hz, such as between 500 Hz and 800 Hz, or at least approximately 600 Hz. The upper cutoff frequency can be chosen in that a prefix of the anti-noise signal does not change within the noise reduction area. This prerequisite has been found advantageous for the stability of the noise-canceling algorithm. When calculating a spatial distance from a frequency in one of the mentioned ranges, applying the well-known formula by further taking into account the speed of sound, this results in a spatial distance of about 0.2 m. This limit can be a maximum distance for the points at which the virtual microphones are arranged. The same applies for a distance between the point at which the virtual microphone can be arranged, i.e. one of the aforementioned points, and the physical position of the direct microphone.

Such object can be further solved by a method of operating a noise reduction system for actively compensating background noise generated by a noise source in a noise reduction area in a passenger transport area of a vehicle, the system comprising a controller, a reference sensor for detecting the background noise of the noise source, a sound generator for generating anti-noise for superimposing the anti-noise with the background noise in the noise reduction area for active reduction of the background noise, and a monitor-microphone array having a plurality of monitor microphones, the monitor-microphone array being disposed adjacent to the noise reduction area and being configured to pick up background noise emitted by the noise source and anti-noise emitted by the sound generator, wherein a virtual sensing algorithm is implemented in the controller, which thereby estimates an error signal at a position of a virtual microphone, wherein the virtual microphone is located in the noise reduction area and the error signal is indicative of a difference between the background noise and the anti-noise at the position of the virtual microphone, the controller further comprises an anti-noise unit for generating an anti-noise signal for driving the sound generator in that it generates the anti-noise, wherein the method can be further enhanced in that the controller further can comprise an averaging unit, which calculates an average error signal, which can be indicative of a difference between the background noise and the anti-noise at a position in the noise reduction area, wherein the monitor-microphone array can comprise a direct monitor microphone and the averaging unit can calculate the average error signal by further taking into account a direct residual signal of the direct monitor microphone and wherein the controller can further comprise a dynamic adjustment unit, which can update parameters of the anti-noise unit based on the average error signal and so as to minimize the average error signal.

Furthermore, according to an embodiment, the method can be further enhanced in that the controller can comprise:

a first filter unit, which can receive the anti-noise signal and estimate a shifted anti-noise signal, which can be indicative of the anti-noise at a physical position of one of the monitor microphones of the microphone array, a first arithmetic unit, which can receive the shifted anti-noise signal and a monitor signal of the monitor microphone being located at said physical position, wherein the first arithmetic unit can calculate a residual signal, which can be a difference between the monitor signal and the shifted anti-noise signal at the physical position of the monitor microphone, a second filter unit can receive the residual signal and estimate a shifted residual signal, which can be the residual signal shifted to the position of the virtual microphone, a third filter unit, which can receive the anti-noise signal and estimate a shifted anti-noise signal, which can be indicative of the anti-noise at the position of the virtual microphone, a second arithmetic unit, which can receive the shifted residual signal and the shifted anti-noise signal and estimate the error signal for the position of the virtual microphone by adding the shifted residual signal and the shifted anti-noise signal, and wherein the first filter unit can further estimate a shifted direct anti-noise signal, which can be indicative of the anti-noise at a physical position of the direct monitor microphone, the first arithmetic unit can further receive the shifted direct anti-noise signal and a direct monitor signal of the direct monitor microphone, wherein the first arithmetic unit can further calculate a direct residual signal, which can be a difference between the direct monitor signal and the shifted direct anti-noise signal at the position of the direct monitor microphone, the second filter unit and the second arithmetic unit can bypass the direct residual signal and the averaging unit can calculate the average error signal, which can be an average of the at least one error signal for a position in the noise reduction area and the direct residual signal.

According to an alternative embodiment, the method can be enhanced in that the averaging unit can receive a plurality of monitor signals of monitor microphones being located at different physical positions and estimate an area monitor signal, which can be indicative of an error signal captured by the monitor microphones for a predetermined area of the monitor microphones, wherein the controller comprises:

a first filter unit, which can receive the anti-noise signal and estimate a shifted area anti-noise signal, which can be indicative of the anti-noise in the predetermined area, a first arithmetic unit, which can receive the shifted area anti-noise signal and the area monitor signal, wherein the first arithmetic unit can calculate an area residual signal, which can be a difference between the area monitor signal and the shifted area anti-noise signal, a second filter unit, which can receive the area residual signal and estimate a shifted area residual signal, which can be the area residual signal shifted to a predetermined virtual area comprising more than one position of a virtual microphone, a third filter unit, which can receive the anti-noise signal and estimate a shifted area anti-noise signal, which can be indicative of the anti-noise in the predetermined virtual area, and the averaging unit can further comprise a second arithmetic unit, which can receive the shifted area residual signal and the shifted area anti-noise signal and estimate the error signal for the predetermined virtual area as the average error signal by adding the shifted area residual signal and the shifted area anti-noise signal, and wherein, the averaging unit can bypass a direct monitor signal of the direct monitor microphone, the first arithmetic unit can further receive the shifted direct anti-noise signal and a direct monitor signal of the direct monitor microphone, wherein the first arithmetic unit can further calculate a direct residual signal, which can be a difference between the direct monitor signal and the shifted direct anti-noise signal at the position of the direct monitor microphone, the first arithmetic unit can further receive the shifted direct anti-noise signal and a direct monitor signal of the direct monitor microphone, wherein the first arithmetic unit can further calculates a direct residual signal, which can be a difference between the direct monitor signal and the shifted direct anti-noise signal at the position of the direct monitor microphone, the second filter unit and the second arithmetic unit can bypass the direct residual signal and the averaging unit can further calculate the average error signal, which can be an average of the error signal for the predetermined virtual area and the direct residual signal.

According to still another embodiment, the method can be further enhanced in that a plurality of positions can be located in the noise reduction area and the controller can estimate at least a first error signal for a virtual microphone located at a first position and a second error signal for a virtual microphone located at a second position and the averaging unit calculates the average error signal from at least the first and the second error signal and wherein the averaging unit can calculate the average error signal, which is a weighted average of the at least first and second error signal.

The noise reduction system can further comprise a position detection unit which can detect a position and/or orientation of a head of a passenger and estimates a position of an ear of a passenger in the passenger transport area, wherein the controller can further select a main position of the plurality of positions, which can be adjacent to, such as close to, the estimated position of the ear of the passenger, wherein the averaging unit can give an overweight to the error signal at the main position when calculating the average error signal.

According to still another embodiment, the method can be further enhanced in that the controller can further comprise at least one band pass unit, which can apply a band pass filter on the average error signal and/or on a noise signal picked up by the reference sensor for detecting the background noise of the noise source.

With respect to the method according to an embodiment, same or similar advantages and advantageous embodiments apply as have been mentioned with respect to the noise reduction system.

The object can be further solved by a use of the noise reduction system according to embodiments for compensating background noise generated by a noise source in a noise reduction area in a passenger transport area of a vehicle. This vehicle can be a commercial vehicle, or a construction vehicle.

BRIEF DESCRIPTION OF THE DRAWINGS

Further features of the embodiments will become apparent from the description of the embodiments together with the claims and the attached drawings. Embodiments can fulfill individual features or a combination of several features.

The embodiments are described below, without restricting the general idea of the invention, using exemplary embodiments with reference to the drawings, express reference being made to the drawings with regard to all details that are not explained in greater detail in the text. In the drawings.

In the drawings, the same or similar elements and/or parts are provided with the same reference numbers in order to prevent the item from needing to be reintroduced.

DETAILED DESCRIPTION

Figure 1:
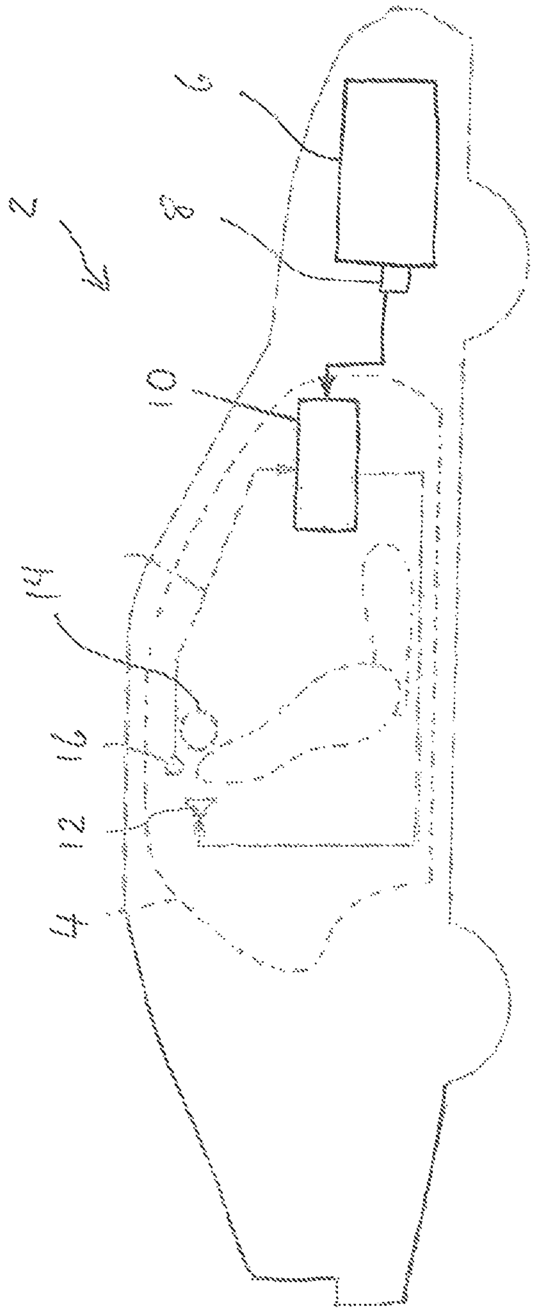
FIG. 1 illustrates a simplified schematic drawing illustrating a vehicle comprising a noise reduction system.

FIG. 1 is a simplified schematic drawing of a vehicle 2, which can be a passenger car, a commercial vehicle, a construction vehicle or any other road driven vehicle. The vehicle 2 comprises a passenger transport area 4, which is illustrated in dashed line. The vehicle 2 is equipped with a noise reduction system for actively compensating background noise, which is generated by a noise source 6. The noise source 6 can be the engine of the vehicle 2 or any other device or source which generates undesired background noise. For example, the noise source 6 can be a wheel, an auxiliary drive or a mechanic or hydraulic system of the vehicle 2. The noise, which is to be reduced in the passenger transport area 4 is measured by a sensor 8. The sensor 8 can be any device suitable for detecting the background noise of the noise source 6. It can be a microphone or an acceleration sensor. The sensor 8 is not limited to an electro acoustical or electromechanical device like a microphone. It is also possible to input a signal related to the background noise source 6 to a model, which outputs a computed background noise signal. For example, a number of revolutions of an engine or any other suitable parameter thereof can be input to the model of the engine or can be directly input to the noise-canceling system. In other words, parameters of the noise source 6, which are electronically available, can be directly used for estimation of the background noise.

The noise reduction system of the vehicle 2 comprises a control unit 10 (such as a processor/controller comprising hardware), which can be a separate electronic device. The control unit 10, however, can also be implemented as software in a main controller of the vehicle 2, which, in this case, provides the control unit 10. The noise reduction system further comprises a sound generator 12 for generating anti-noise. The sound generator 12 can be a loudspeaker. The anti-noise and the background noise are superimposed in a noise reduction area 14 for active reduction of the background noise. Furthermore, the noise reduction system comprises a monitor-microphone array 16, which is disposed adjacent to the noise reduction area 14. The monitor microphone array 16 is configured to pick up background noise emitted by the noise source 6 and anti-noise emitted by the sound generator 12.

Figure 2:
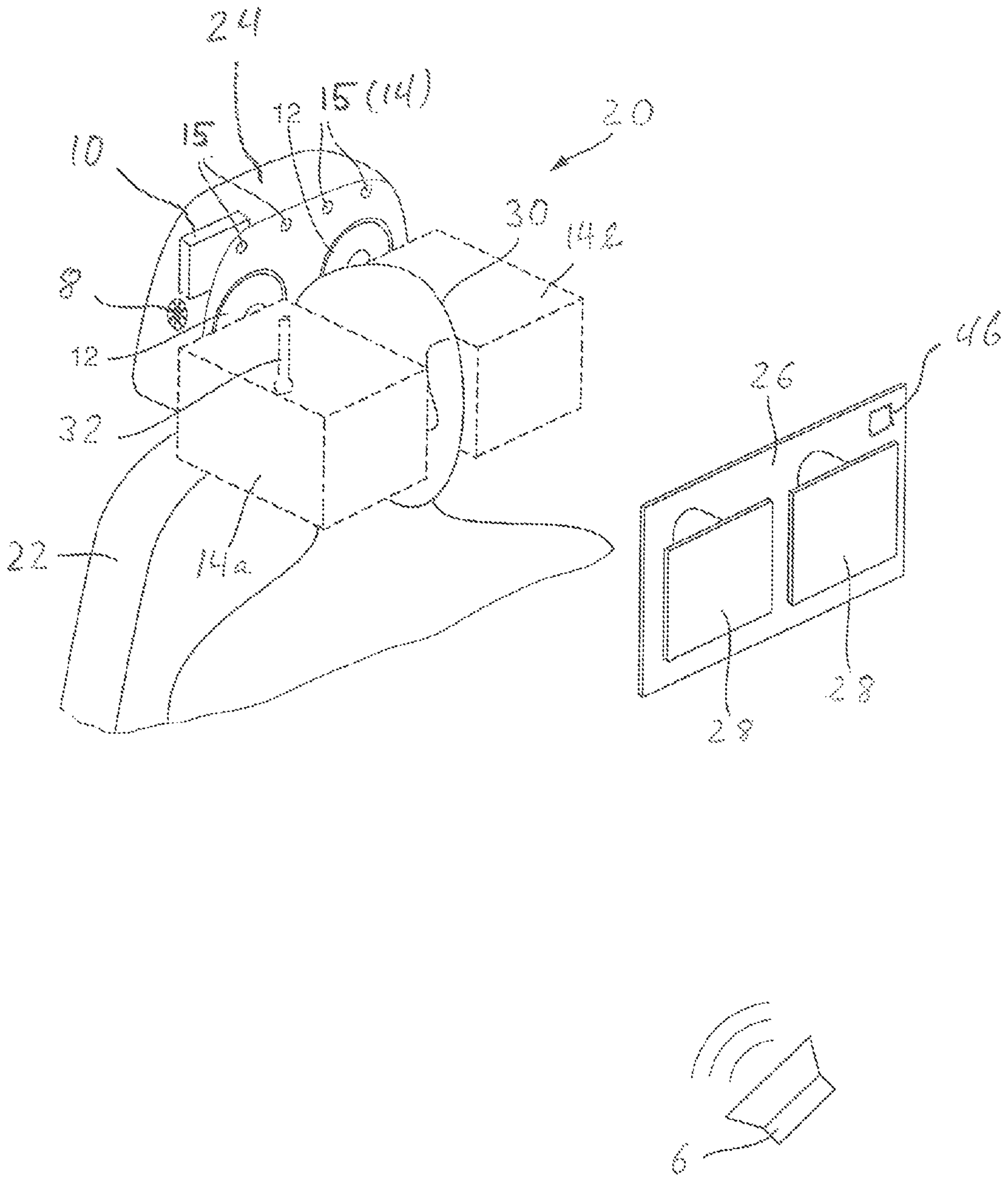
FIG. 2 illustrates a simplified schematic illustration of a noise reduction system and FIGS. 3 to 5 illustrate embodiments of the noise reduction system.

FIG. 2 shows a simplified schematic illustration of the noise reduction system which can be integrated in the vehicle 2 shown in FIG. 1. By way of an example, the main parts of the system are arranged in a driver's seat 22, such as in a headrest 24 of the seat 22.

There is the control unit 10, a plurality of monitor microphones 15 forming the monitor-microphone array 16 and the sound generator 12. Furthermore, a sensor 8, for example a microphone, can be arranged in the headrest 24 for detecting the background noise of the noise source 6 (schematically represented by a loudspeaker). The senor 8 can also be arranged remote from the remaining parts of the system 20 as it is for example illustrated in FIG. 1. The noise reduction system 20 in FIG. 2 is a compact system, which can be completely implemented in one single unit, by way of an example in the headrest 24. In a more distributed system, it is also possible that the noise-canceling system 20 uses existing sensors, which are already present in the vehicle 2 and are used by other systems of the vehicle 2, for example by an audio system.

The noise reduction system 20 can be used with or without the sensor 8. The presence of the sensor 8 depends on whether the noise reduction system 20 is a feed forward system (with the reference sensor 8) or a feedback system (without the reference sensor 8). If the system 20 dispenses with the sensor 8, the background noise is directly detected using the monitor-microphone array 16. Furthermore, the noise reduction system 20 comprises a sound generator 12, which is for example a loudspeaker. The sound generator 12 is also located in the headrest 24 by way of an example only.

The noise reduction system 20 further comprises a head tracking system 26, which comprises for example a pair of stereo cameras 28. The head tracking system 26 is applied for detecting a position and/or orientation of the head 30 of a passenger, who is situated in the passenger transport area 4. The head tracking system 26 is suitable for detecting the position of an ear of the user, such as the location of the entrance of the auditory channel. The head tracking system 26 can also be integrated in the headrest 24 so as to provide an integrated system. The position of the user's head 30 is detected or computed by the position detection unit 46 of the head tracking system 26.

The head tracking is suitable for establishing the noise reduction area 14 in that it is directly adjacent to the passenger's head 30, i.e. near to the passenger's ears. When making reference to a noise reduction area 14, it should be noted that there is a right noise reduction area 14*b* and a left noise reduction area 14*a*, which are established so as to provide a suitable noise reduction for both ears of the user. By way of an example and without limitation, for the purpose of simplification of explanations only, reference will be made to a noise reduction area 14 in the following. Notwithstanding the explanations are made for a single noise reduction area 14, the noise reduction system 20 is suitable for establishing two or even more noise reduction areas 14 for at least both ears of a passenger or even for a plurality of passengers.

In an attempt to establish the noise reduction area 14 at the most suitable position for efficient noise reduction, the noise reduction system 20 applies the concept of virtual microphones 32. The virtual microphone 32 is established in the noise reduction area 14. At a position of the virtual microphone 32, an error function is detected, which is the residual noise at the position of the virtual microphone 32 after noise cancelation. By minimizing the error function at the position of the virtual microphone 32, the noise reduction system 20 optimizes noise-canceling performance. This is why it is desirable to place the virtual microphone 32 as near to the entrance of the auditory channel of the passenger's head 30 as possible. This can be performed by for example relocating the position of the virtual microphone 32 based on data generated by the head tracking system 26.

The control unit 10 runs a virtual sensing algorithm which is commonly referred to as the "remote microphone technique". Without prejudice, reference will be made to this type of algorithm in the following. According to further embodiments, alternative algorithms can be run on the control unit 10. These are for example algorithms referred to as: "virtual microphone arrangement", "forward difference prediction technique", "adaptive LMS virtual microphone technique", "Kalman filtering virtual sensing" or "stochastically optimal tonal diffuse field virtual sensing technique".

Figure 3:
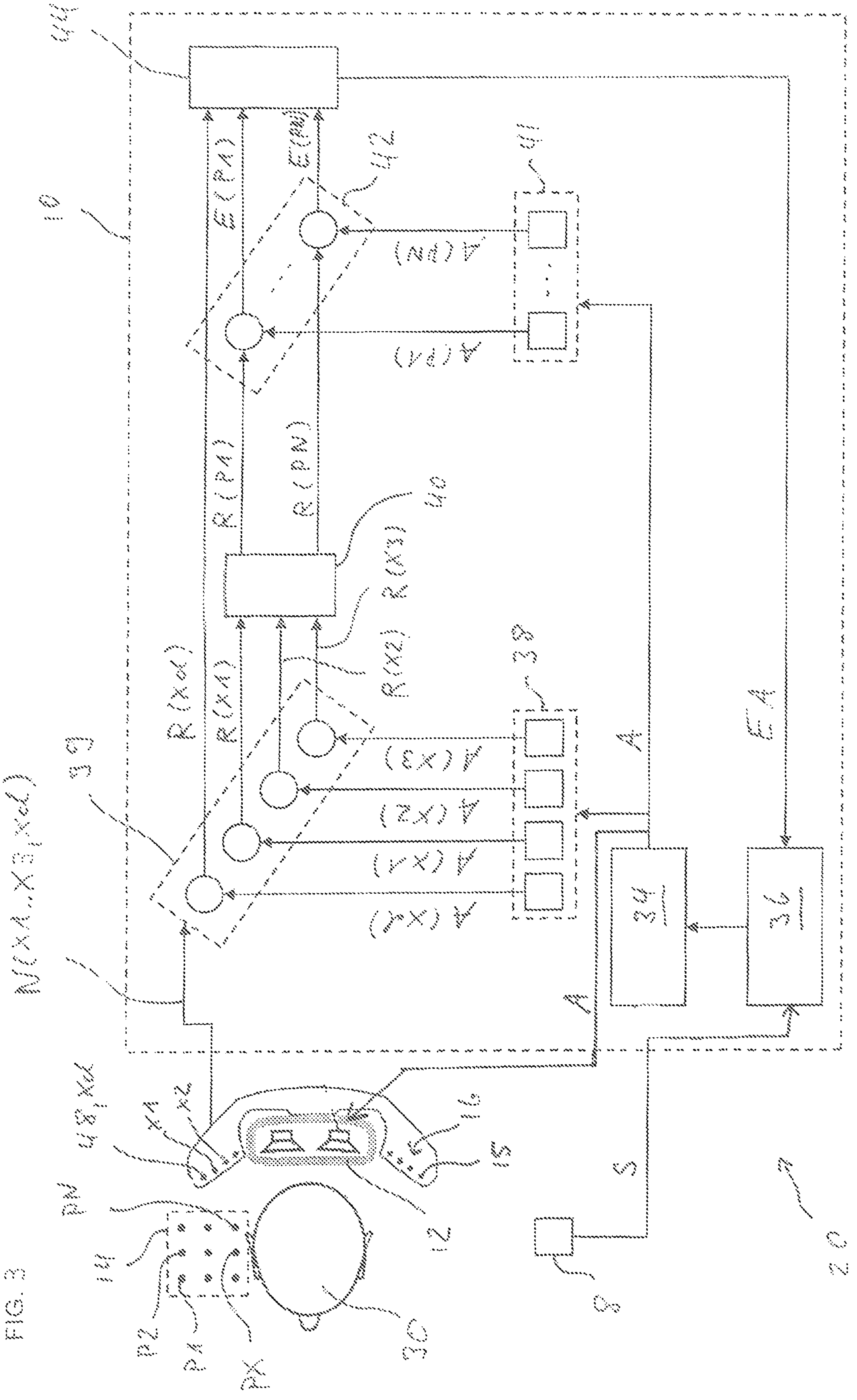

FIG. 3 is a drawing illustrating a noise reduction system 20 according to an embodiment. The system 20 comprises the sensor 8 detecting the background noise of the noise source 6. The background noise is converted to a noise signal S, which is input to a dynamic adjustment unit 36, which is configured to update parameters of an anti-noise unit 34, which is configured for generating an anti-noise signal A. The anti-noise signal A is for driving the sound generator 12 in that it emits the anti-noise for superposition with the background noise of the noise source 6 in the noise reduction area 14. By way of an example only, this is illustrated in FIG. 3 and the following figures for only one ear of the passenger's head 30. Furthermore, there is a dynamic adjustment unit 36 for updating parameters of the anti-noise filter unit 34 based on an average error signal EA and so as to minimize the average error signal EA in an attempt to optimize the noise-canceling effect.

The noise reduction system 20 furthermore comprises the microphone array 16, which comprises a plurality of monitor microphones 15 each illustrated using a dot. The microphone array 16 is configured to pick up background noise and anti-noise for a plurality of virtual microphone positions P1, P2 . . . PN. The virtual microphone positions are referred to as P1, P2 . . . PN for an arbitrary number of N of virtual microphones 15. The virtual microphone positions are generally also referred to as P. They are located in the noise reduction area 14 and they can be arranged in a grid, by way of an example only.

A maximum distance between the positions P actually depends on the frequency range in which the noise-canceling algorithm operates. This frequency range can be between 50 Hz and 600 Hz. The upper limit or cutoff frequency is chosen in that a prefix of the anti-noise signal does not invert within the noise reduction area 14. This prerequisite is advantageous for the stability of the noise-canceling algorithm. When calculating a spatial distance from this frequency, this results in a maximum spatial distance of about 0.2 m. This limit should be a maximum distance for the points P, at which the virtual microphones are arranged. The same applies for a maximum distance between the point P at which the virtual microphone can be arranged, i.e. one of the aforementioned points P1 . . . PN and the physical position of the direct microphone 48, which will be explained in detail further below.

The frequency range can be set by integrating a band pass unit 50 in the signal line(s) of the either one or both of the noise signal S and the average error signal EA. The band pass unit 50 is illustrated in FIG. 3 using a dashed line so as to illustrate that it is an optional unit. It can be implemented at the same position in all other embodiments.

In FIG. 3, the control unit 10, which comprises the anti-noise unit 34 and the dynamic adjustment unit 36, further comprises an averaging unit 44, which is configured to calculate the average error signal EA. The average error signal EA is indicative of a difference between the background noise and the anti-noise at more than one position P in the noise reduction area 14, wherein in addition to this, the direct residual signal R(xd) is taken into account. More details will be given further below. The dynamic adjustment unit 36 updates the parameters of the noise-canceling algorithm running in the anti-noise unit 34 based on and so as to minimize the average error signal EA.

The estimation of the average error signal EA reflects more than one position P in the noise reduction area 14. It can be either performed by calculating more than one error signal or by calculating an average error signal, which is indicative of a difference between the background noise and the anti-noise in a predetermined section PQ of the noise reduction area 14, wherein the section PQ comprises more than one position P. The first concept will be explained in the following by making reference to FIGS. 3 and 4, the second concept will be explained by making reference to FIG. 5. Naturally, multiple embodiments of each respective concept are explained when making reference to the figures.

Referring back to FIG. 3, the control unit 10 further comprises a first filter unit 38, which is configured to receive the anti-noise signal A. The first filter unit 38 estimates a shifted anti-noise signal, generally referred to as A(x), which is indicative of the anti-noise at the physical position x of one of the monitor microphones 15 of the microphone array 16. By way of an example, the physical positions of the monitor microphones 15 are denoted x1 . . . x3. The corresponding shifted anti-noise signals for these positions x1 . . . x3 are A(x1), A(x2) and A(x3). The shifted anti-noise signal A(x) represents the estimated anti-noise signal at the respective physical position of the monitor microphones 15. For the calculation of the individual signals A(x1), A(x2) and A(x3), the first filter unit 38 can comprise respective subunits.

Furthermore, the control unit 10 comprises a first arithmetic unit 39. The first arithmetic unit 39 receives the shifted anti-noise signals A(x) and a monitor signal, generally referred to as N(x), of the monitor microphones 15 being located at the physical position x. The first arithmetic unit 39 can receive the shifted anti-noise signals A(x1), A(x2) and A(x3) and the monitor signal N(x1 . . . x3) of the monitor microphones 15 being located at positions x1 . . . x3. The first arithmetic unit 39 is configured to calculate a residual signal, which is generally denoted R(x) and which is a difference between the monitor signal N(x) and the shifted anti-noise signal A(x) at the physical position x of the monitor microphone 15. The first arithmetic unit 39 can calculate the residual signals R(x1), R(x2) and R(x3), which is a respective difference between A(x1) and N(x1), A(x2) and N(x2), A(x3) and N(x3). The residual signal R(x) is the residual noise at the respective position x of the monitor microphone 15, which means the noise generated by the noise source 6 minus the anti-noise signal at a respective position x.

The residual signals R(x) are input to a second filter unit 40. The second filter unit 40 is configured to estimate a shifted residual signal R(P), which is the residual signal R(x) shifted to the position P of the virtual microphone. Residual signals R(P1) . . . R(N) for a respective one of the position P1 . . . PN, such as for all the positions P in the noise reduction area 14, can be calculated.

The control unit 10 further comprises a third filter unit 41, which receives the anti-noise signal A. The third filter unit 41 is configured to estimate a shifted anti-noise signal, which is generally denoted A(P) and which is indicative of the anti-noise at the position P of the virtual microphone 32. For calculation of a respective one of the shifted anti-noise signals A(P1) . . . A(PN), the third filter unit 41 can comprise respective subunits.

Furthermore, the control unit 10 comprises a second arithmetic unit 42, which receives the residual signals R(P) and the shifted anti-noise signals A(P), respectively. The second arithmetic unit 42 can receive the shifted residual signals R(P1) . . . R(PN) and the shifted anti-noise signals A(P1) . . . A(PN) for a respective one of the positions P1 . . . PN in the noise reduction area 14. The second arithmetic unit 42, from a respective one of these pairs of values, calculates or estimates an error signal, which should be generally denoted E(P), for the position P of the virtual microphone. A first error signal E(P1) can be calculated for a point P1, a second error signal E(P2) can be calculated for a point P2, wherein this is continued up to the maximum number N of points P in the noise reduction area 14, which means the error signal E(PN).

All the error signals E(P1) . . . E(PN), which are generally referred to as and error signal E, are input to the averaging unit 44. From the error signals E(P) and the direct residual signal R(xd), the averaging unit 44 calculates the average error signal EA. The average error signal EA can be the arithmetic average of all the previously mentioned error signals E(P1), E(P2) . . . E(PN). This averaging is performed at least for the first and the second position P1, P2 of the virtual microphones. The averaging unit 44 can be configured to compute the average error signal EA, which is the average of every error signals E(P1), E(P2) . . . E(PN) for all positions P1, P2 . . . PN of the virtual microphones located in the noise reduction area 14. The average error signal EA is input to the dynamic adjustment unit 36 to update parameters of the anti-noise filter unit 34, which means the updated parameters are calculated based on information about the average error signal EA and so as to minimize the average error signal EA. This leads to the effect of minimization of background noise generated by the noise source 6 in the noise reduction area 14.

The averaging unit 44 can be configured to calculate the average error signal EA from an arithmetic average of the individual error signals E(P1), E(P2) . . . E(PN). According to another embodiment, the averaging unit 44 of the noise reduction system 20 is configured to calculate the average error signal EA as a weighted average. This can be performed by giving one or more of the error signals E(P1), E(P2) . . . E(PN) an individual weight or weighting factor. When calculating this weighted average, particular emphasis can be put on a certain point P, at which a main virtual microphone is located. For example, if the head 30 of the passenger is in the position illustrated in FIG. 3, the point PX is located nearest to the ear of the passenger. Consequently, the best performance of the noise reduction should be at this particular point PX. Hence, an overweight can be placed on the error function E(PX) for the point PX and the corresponding virtual microphone. This can be performed by for example giving the error function a higher weighting factor than the remaining error functions of the other points P.

The location of the point PX, which is located nearest to the user's or passenger's ear, can be performed by for example the head tracking system 26. For this purpose, the head tracking system 26 (see FIG. 2) comprises not only the camera arrangement, comprising the stereo cameras 28, but also the position detection unit 46. The position detection unit 46 is configured for detecting a position and/or orientation of the head 30 of the user in the passenger transport area 4. The control unit 10 of the noise reduction system 20 is than configured to select position PX as a main virtual microphone position, which is by way of an example only the position referred to as PX. This selection can be made out of the plurality of predetermined positions P1, P2 . . . PN of the virtual microphones in the noise reduction area 14. However, it is also possible to determine the position PX while disregarding the grid in which the remaining positions P1, P2 . . . PN are arranged. The main microphone position PX can be the position adjacent to an estimated position of an ear of the user. The averaging unit 44 is configured to overweight the error signal E(PX) of this main virtual microphone position PX when calculating the average error signal EA.

In the embodiment shown in FIG. 3, the system 20 comprises a microphone array 16 having a direct microphone 48, which is located at the direct error microphone position xd. The averaging unit 44 is configured to calculate the average error signal EA by further taking into account the direct residual signal R(xd) of the direct microphone 48.

The first filter unit 38 is configured to estimate a shifted direct anti-noise signal A(xd). This signal A(xd) is indicative of the anti-noise at the physical position xd of the direct monitor microphone 48. Furthermore, the first arithmetic unit 39 is configured to receive the shifted direct anti-noise signal A(xd) and direct monitor signal N(xd) of the direct monitor microphone 48. The unit calculates a direct residual signal R(xd) from the difference of the direct monitor signal N(xd) and the shifted direct anti-noise signal A(xd), for the position xd of the direct monitor microphone 48. The second filter unit 40 and the second arithmetic unit 42 bypass the direct residual signal R(xd). The averaging unit 44 calculates the average error signal EA from the average of the error signals R(P1) . . . R(PN) for the positions P1 . . . PN in the noise reduction area 14 by further taking into account the direct residual signal R(xd). By further taking into account the direct residual signal R(xd), the stability of the noise-canceling in the noise reduction area 14 is enhanced. The significant enhancement of the stability of the algorithm can be explained in that the direct signal adds a "golden reference" to the calculations.

Figure 4:
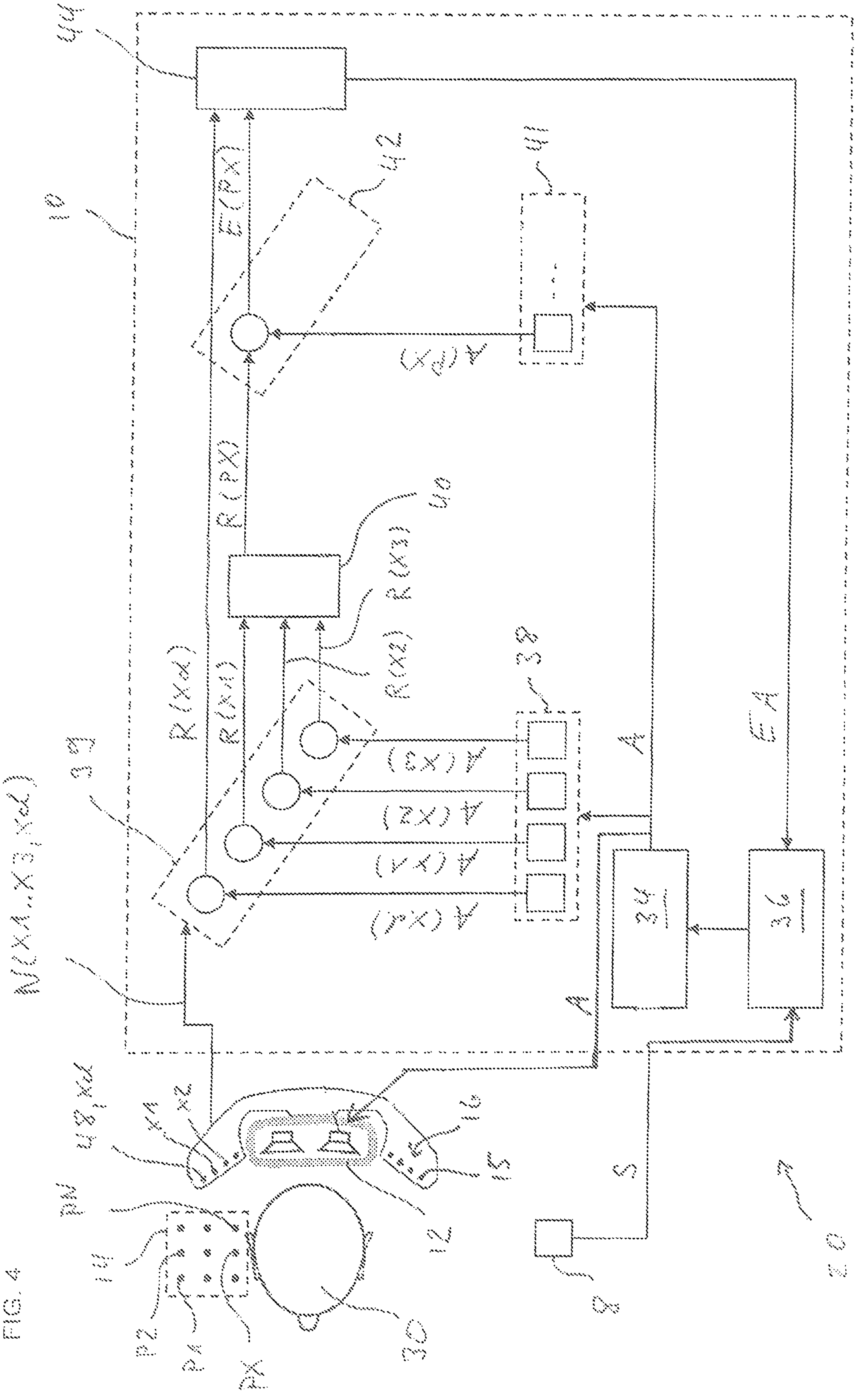

FIG. 4 is another embodiment of a noise reduction system 20 according to a further embodiment. The units which have been explained with reference to FIG. 3 will not be explained repeatedly. Unlike the embodiment in FIG. 3, the second filter unit 40 calculates the shifted residual signal R(PX) for the virtual point PX only, by way of an example. This value is input to the second arithmetic unit 42, which also receives the shifted anti-noise signal A(PX), which is the anti-noise shifted to the virtual point PX. The second arithmetic units 42 outputs an error signal E(PX) for the virtual point PX. This is input to the averaging unit 44. At the same time, the averaging unit 44 receives the direct residual signal R(xd) from the first arithmetic unit 39. From these two values, the averaging unit 44 calculates the average error signal EA.

Figure 5:
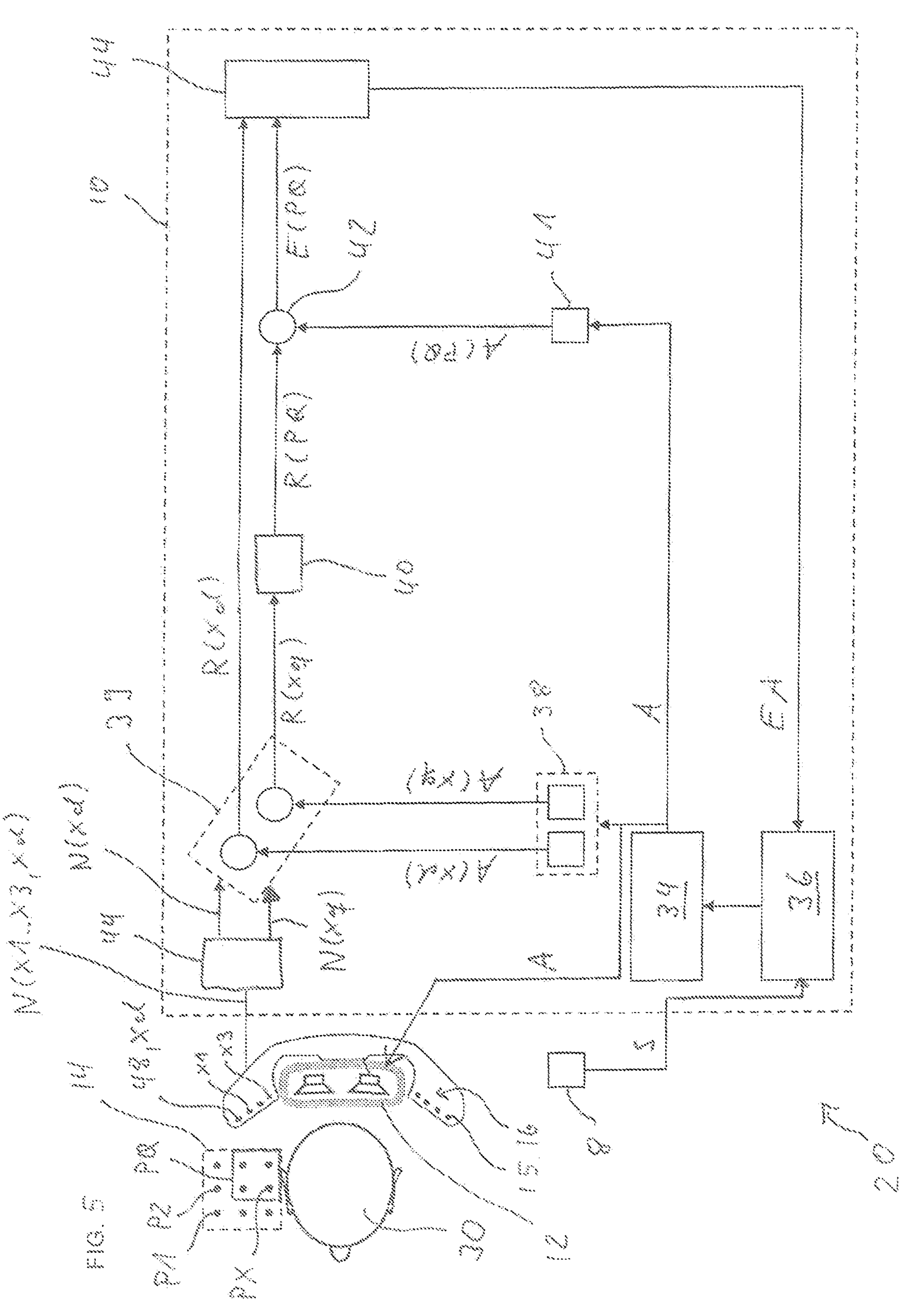

There is a further embodiment of the noise reduction system 20, which is illustrated in FIG. 5. This system 20 comprises a microphone array 16 also having a direct microphone 48. The parts and units of the system 20 having the same reference numerals have already been explained when making reference to FIGS. 3 and 4. The arrangement and functionality of the units are similar. FIG. 5 shows a noise reduction system 20 having a control unit 10, which comprises an averaging unit 44, which is unlikely the before explained embodiments configured to receive a plurality of monitor signals N(X) of the monitor microphones 15 being located at different physical positions x and to estimate an area monitor signal N(xq). This area monitor signal N(xq) is indicative of an error signal captured by the monitor microphones 15 for a predetermined area xq of the monitor microphones 15. The first filter unit 38 is configured to receive the anti-noise signal A and to estimate a shifted area anti-noise signal A(xq). This signal is indicative of the anti-noise in the predetermined area xq. The first arithmetic unit 39 receives the shifted area anti-noise signal A(xq) and the area monitor signal N(xq). The first arithmetic unit 39 calculates an area residual signal R(xq), which is the difference between the area monitor signal N(xq) and the shifted area anti-noise signal A(xq). The second filter unit 40 receives the area residual signal R(xq) and estimates a shifted area residual signal R(PQ). The shifted area residual signal R(PQ) is the area residual signal R(xq) shifted to a predetermined virtual area PQ, which comprises more than one position P of the virtual microphones 32. The predetermined virtual area PQ is exemplarily illustrated as a subarea or section of the noise reduction area 14.

The third filter unit 41 receives the anti-noise signal A and estimates a shifted area anti-noise signal A(PQ), which is indicative of the anti-noise in the predetermined virtual area PQ. The averaging unit 44 further comprises the second arithmetic unit 42, which is configured to receive the shifted area residual signal R(PQ) and the shifted area anti-noise signal A(PQ). The second arithmetic unit 42 further estimates the error signal E(PQ) for the predetermined virtual area PQ as the average error signal EA. The average error signal EA is again feedback to the dynamic adjustment unit 36 so as to adapt or optimize the parameters of the anti-noise unit 34.

The concept of the area calculation of the monitor signal N, the residual signal R and the anti-noise signal A is supplemented by further taking into account the signal of a direct microphone 48. This will be explained in the following. The first filter unit 38 is configured to estimate a shifted direct anti-noise signal A(xd). This signal A(xd) is indicative of the anti-noise at the physical position xd of the direct monitor microphone 48. Furthermore, the first arithmetic unit 39 is configured to receive the shifted direct anti-noise signal A(xd) and direct monitor signal N(xd) of the direct monitor microphone 48. The unit calculates a direct residual signal R(xd) from the difference of the direct monitor signal N(xd) and the shifted direct anti-noise signal A(xd), for the position xd of the direct monitor microphone 48. The second filter unit 40 and the second arithmetic unit 42 bypass the direct residual signal R(xd). The averaging unit 44 calculates the average error signal EA from the average of the error signals R(P1) . . . R(PN) for the positions P1 . . . PN in the noise reduction area 14 by further taking into account the direct residual signal R(xd). By further taking into account the direct residual signal R(xd), the stability of the noise-canceling in the noise reduction area 14 is enhanced.

The various units described as part of the control unit 10 in FIGS. 3-5 can be implemented as a single controller configured to perform each of the functions of the various units therein or as separate controllers or computing modules within the control unit 10 and can each be configured as dedicated hardware circuits or software implemented on hardware controllers/computing modules.

While there has been shown and described what is considered to be embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

TABLE OF REFERENCE SIGNS

2 vehicle
4 passenger transport area
6 noise source
8 reference sensor
10 control unit
12 sound generator
14 noise reduction area
14*a* left noise reduction area
14*b* right noise reduction area
15 monitor microphone
16 monitor-microphone array
20 noise reduction system
22 seat
24 headrest
26 head tracking system
28 stereo cameras
30 head
32 virtual microphone
34 anti-noise unit
36 dynamic adjustment unit
38 first filter unit
39 first arithmetic unit
40 second filter unit
41 third filter unit
42 second arithmetic unit
44 averaging unit
46 position detection unit
48 direct monitor microphone
50 band pass unit
S noise signal
A anti-noise signal
N monitor signal
R residual signal
E error signal
P virtual microphone position
PQ predetermined virtual area
EA average error signal
PX main virtual microphone position
x physical microphone position
xd position of the direct microphone xq predetermined area
A(x) shifted anti-noise signal
A(xd) shifted direct anti-noise signal
A(xq) shifted area anti-noise signal
N(x) monitor signal
N(xd) direct monitor signal
N(xq) area monitor signal
R(x) residual signal
R(xd) direct residual signal
R(xq) area residual signal
R(P) shifted residual signal
R(PQ) shifted area residual signal
A(P) shifted anti-noise signal
A(PQ) shifted area anti-noise signal
E(P) error signal for point P
E(PQ) error signal for the virtual area PQ

What is claimed is:

1. A noise reduction system for actively compensating background noise generated by a noise source in a noise reduction area in a passenger transport area of a vehicle, the system comprising:

- a controller comprising hardware;
- a reference sensor for detecting the background noise of the noise source;
- a sound generator for generating anti-noise for superimposing the anti-noise with the background noise in the noise reduction area for active reduction of the background noise;
- a monitor-microphone array having a plurality of monitor microphones, the monitor-microphone array being disposed adjacent to the noise reduction area and being configured to pick up background noise emitted by the noise source and anti-noise emitted by the sound generator, the monitor-microphone array comprises a direct monitor microphone;
- wherein a virtual sensing algorithm is implemented in the controller, the controller being configured to:
  - estimate an error signal at a position of a virtual microphone, wherein the virtual microphone is located in the noise reduction area and the error signal is indicative of a difference between the background noise and the anti-noise at the position of the virtual microphone;
  - generate an anti-noise signal for driving the sound generator in that it generates the anti-noise;
  - calculate an average error signal, which is indicative of a difference between the background noise and the anti-noise at a position in the noise reduction area;
  - calculate the average error signal by further taking into account a direct residual signal of the direct monitor microphone; and
  - update parameters of the anti-noise unit based on the average error signal so as to minimize the average error signal.

2. The noise reduction system according to claim 1, wherein the controller is configured to:

- estimate a shifted anti-noise signal, which is indicative of the anti-noise at a physical position of one of the monitor microphones of the monitor-microphone array;
- calculate a residual signal, which is a difference between a monitor signal of the monitor microphone and the shifted anti-noise signal at the physical position of the monitor microphone;
- estimate a shifted residual signal, which is the residual signal shifted to the position of the virtual microphone;
- estimate a shifted anti-noise signal, which is indicative of the anti-noise at the position of the virtual microphone;
- estimate the error signal for the position of the virtual microphone by addition of the shifted residual signal and the shifted anti-noise signal;
- estimate a shifted direct anti-noise signal, which is indicative of the anti-noise at a physical position of the direct monitor microphone;
- calculate a direct residual signal, which is a difference between a direct monitor signal of the direct monitor microphone and the shifted direct anti-noise signal at the position of the direct monitor microphone; and
- calculate the average error signal, which is an average of the at least one error signal for a position in the noise reduction area and the direct residual signal.

3. The noise reduction system according to claim 1, wherein the controller is further configured to receive a plurality of monitor signals of monitor microphones being located at different physical positions and to estimate an area monitor signal, which is indicative of a monitor signal captured by the monitor microphones for a predetermined area of the monitor microphones, wherein the controller is further configured to:

- estimate a shifted area anti-noise signal, which is indicative of the anti-noise in the predetermined area;
- calculate an area residual signal, which is a difference between the area monitor signal and the shifted area anti-noise signal;
- estimate a shifted area residual signal, which is the area residual signal shifted to a predetermined virtual area comprising more than one position of a virtual microphone;
- estimate a shifted area anti-noise signal, which is indicative of the anti-noise in the predetermined virtual area;
- estimate the error signal for the predetermined virtual area as the average error signal, by addition of the shifted area residual signal (R(PQ)) and the shifted area anti-noise signal;
- calculate a direct residual signal, which is a difference between a direct monitor signal of the direct monitor microphone and the shifted direct anti-noise signal at the position of the direct monitor microphone;
- calculate a direct residual signal, which is a difference between the direct monitor signal and the shifted direct anti-noise signal at the position of the direct monitor microphone; and
- calculate the average error signal, which is an average of the error signal for the predetermined virtual area and the direct residual signal.

4. The noise reduction system according to claim 1, wherein a plurality of positions are located in the noise reduction area and the controller is configured to:

- estimate at least a first error signal for a virtual microphone located at a first position and a second error signal for a virtual microphone located at a second position;
- calculate the average error signal from at least the first and the second error signal; and
- calculate the average error signal, which is a weighted average of the at least first and second error signal.

5. The noise reduction system according to claim 4, wherein the controller is further configured to:

- detect a position and/or orientation of a head of a passenger and estimate a position of an ear of a passenger in the passenger transport area;
- select a main position of the plurality of positions, which is adjacent to the estimated position of the ear of the passenger; and overweight the error signal at the main position when calculating the average error signal.

6. The noise reduction system according to claim 1, wherein the controller is further configured to apply a band pass filter on the average error signal and/or on a noise signal picked up by the reference sensor for detecting the background noise of the noise source.

7. A method of operating a noise reduction system for actively compensating background noise generated by a noise source in a noise reduction area in a passenger transport area of a vehicle, the system comprising a controller comprising hardware, a reference sensor for detecting the background noise of the noise source, a sound generator for generating anti-noise for superimposing the anti-noise with the background noise in the noise reduction area for active reduction of the background noise, and a monitor-microphone array having a plurality of monitor microphones, the monitor-microphone array being disposed adjacent to the noise reduction area and being configured to pick up background noise emitted by the noise source and anti-noise emitted by the sound generator, the monitor-microphone array comprises a direct monitor microphone, the method comprising:

implementing a virtual sensing algorithm to estimate an error signal at a position of a virtual microphone, wherein the virtual microphone is located in the noise reduction area and the error signal is indicative of a difference between the background noise and the anti-noise at the position of the virtual microphone;

generating an anti-noise signal for driving the sound generator in that it generates the anti-noise;

calculating an average error signal, which is indicative of a difference between the background noise and the anti-noise at a position in the noise reduction area;

calculating the average error signal by further taking into account a direct residual signal of the direct monitor microphone; and updating parameters of the anti-noise unit based on the average error signal to minimize the average error signal.

8. The method according to claim 7, further comprising:

estimating a shifted anti-noise signal, which is indicative of the anti-noise at a physical position of one of the monitor-microphones of the microphone array;

calculating a residual signal, which is a difference between a monitor signal of the monitor microphone and the shifted anti-noise signal at the physical position of the monitor microphone;

estimating a shifted residual signal, which is the residual signal shifted to the position of the virtual microphone;

estimating a shifted anti-noise signal, which is indicative of the anti-noise at the position of the virtual microphone;

estimating the error signal for the position of the virtual microphone by adding the shifted residual signal and the shifted anti-noise signal;

estimating a shifted direct anti-noise signal, which is indicative of the anti-noise at a physical position of the direct monitor microphone;

calculates a direct residual signal, which is a difference between the direct monitor signal and the shifted direct anti-noise signal at the position of the direct monitor microphone; and calculating the average error signal, which is an average of the at least one error signal for a position in the noise reduction area and the direct residual signal.

9. The method according to claim 7, further comprising:

receiving a plurality of monitor signals of monitor microphones being located at different physical positions and estimating an area monitor signal, which is indicative of an error signal captured by the monitor microphones for a predetermined area of the monitor microphones;

estimating a shifted area anti-noise signal, which is indicative of the anti-noise in the predetermined area;

calculating an area residual signal, which is a difference between the area monitor signal and the shifted area anti-noise signal;

estimating a shifted area residual signal, which is the area residual signal shifted to a predetermined virtual area comprising more than one position of a virtual microphone;

estimating a shifted area anti-noise signal, which is indicative of the anti-noise in the predetermined virtual area;

estimating the error signal for the predetermined virtual area as the average error signal by adding the shifted area residual signal and the shifted area anti-noise signal;

calculating a direct residual signal, which is a difference between a direct monitor signal of the direct monitor microphone and the shifted direct anti-noise signal at the position of the direct monitor microphone;

calculating a direct residual signal, which is a difference between the direct monitor signal and the shifted direct anti-noise signal at the position of the direct monitor microphone; and calculating the average error signal, which is an average of the error signal for the predetermined virtual area and the direct residual signal.

10. The method according to claim 7, wherein a plurality of positions are located in the noise reduction area and the method further comprises:

estimating at least a first error signal for a virtual microphone located at a first position and a second error signal for a virtual microphone located at a second position;

calculating the average error signal from at least the first and the second error signal; and calculating the average error signal, which is a weighted average of the at least first and second error signal.

11. The method according to claim 10, wherein the method further comprises:

detecting a position and/or orientation of a head of a passenger and estimating a position of an ear of the passenger in the passenger transport area;

selecting a main position of the plurality of positions, which is adjacent to the estimated position of the ear of the passenger; and overweighting the error signal at the main position when calculating the average error signal.

12. The method according to claim 7, wherein the method further comprises applying a band pass filter on the average error signal and/or on a noise signal picked up by the reference sensor for detecting the background noise of the noise source.

13. A vehicle comprising the noise reduction system according to claim 1.

14. A headrest for a vehicle, the headrest comprising the noise reduction system according to claim 1.

* * * * *